US008651946B1

(12) United States Patent
Doyle

(10) Patent No.: US 8,651,946 B1
(45) Date of Patent: Feb. 18, 2014

(54) COIN-OUT GAMING REWARD SYSTEM

(75) Inventor: Thomas P. Doyle, Reno, NV (US)

(73) Assignee: Bally Gaming, Inc., Las Vegas, NV (US)

(*) Notice: Subject to any disclaimer, the term of this patent is extended or adjusted under 35 U.S.C. 154(b) by 1256 days.

(21) Appl. No.: 11/212,533

(22) Filed: Aug. 25, 2005

(51) Int. Cl.
*A63F 9/24* (2006.01)
*A63F 13/00* (2006.01)

(52) U.S. Cl.
USPC ................... 463/25; 463/16; 463/20; 463/40; 463/42

(58) Field of Classification Search
USPC ................................ 463/1, 40, 42–43, 25–29
See application file for complete search history.

(56) References Cited

U.S. PATENT DOCUMENTS

| | | | | |
|---|---|---|---|---|
| 4,283,709 | A * | 8/1981 | Lucero et al. | 463/25 |
| 5,655,961 | A | 8/1997 | Acres et al. | |
| 5,702,303 | A * | 12/1997 | Takemoto et al. | 463/27 |
| 5,761,647 | A * | 6/1998 | Boushy | 705/10 |
| 5,910,048 | A * | 6/1999 | Feinberg | 463/25 |
| 5,970,143 | A * | 10/1999 | Schneier et al. | 713/181 |
| 6,113,493 | A * | 9/2000 | Walker et al. | 463/25 |
| 6,183,362 | B1 * | 2/2001 | Boushy | 463/25 |
| 6,210,275 | B1 * | 4/2001 | Olsen | 463/16 |
| 6,254,482 | B1 * | 7/2001 | Walker et al. | 463/25 |
| 6,358,149 | B1 * | 3/2002 | Schneider et al. | 463/27 |
| 6,375,569 | B1 | 4/2002 | Acres | |
| 6,592,460 | B2 * | 7/2003 | Torango | 463/27 |
| 6,612,927 | B1 * | 9/2003 | Slomiany et al. | 463/16 |
| 6,659,461 | B2 * | 12/2003 | Yoseloff et al. | 273/274 |
| 6,685,563 | B1 * | 2/2004 | Meekins et al. | 463/25 |
| 6,769,983 | B2 * | 8/2004 | Slomiany | 463/16 |
| 6,769,984 | B2 * | 8/2004 | Duhamel et al. | 463/20 |
| 6,786,824 | B2 * | 9/2004 | Cannon | 463/42 |
| 6,910,964 | B2 * | 6/2005 | Acres | 463/25 |
| 6,966,834 | B1 * | 11/2005 | Johnson | 463/25 |
| 6,991,538 | B2 * | 1/2006 | Cannon | 463/13 |
| 7,040,984 | B2 * | 5/2006 | Mead | 463/16 |
| 7,105,736 | B2 * | 9/2006 | Laakso | 84/615 |
| 7,121,943 | B2 * | 10/2006 | Webb et al. | 463/25 |
| 7,137,883 | B1 * | 11/2006 | Falciglia, Sr. | 463/13 |
| 7,233,911 | B1 * | 6/2007 | Stollery | 705/14 |
| 7,247,096 | B2 * | 7/2007 | Vancura | 463/25 |
| 7,481,707 | B1 * | 1/2009 | Luciano et al. | 463/19 |
| 7,494,416 | B2 * | 2/2009 | Walker et al. | 463/25 |
| 7,963,847 | B2 * | 6/2011 | Baerlocher | 463/27 |
| 7,976,381 | B2 * | 7/2011 | Schugar | 463/25 |
| 2001/0012797 | A1 * | 8/2001 | Walker et al. | 463/25 |
| 2001/0036855 | A1 * | 11/2001 | DeFrees-Parrott et al. | 463/17 |
| 2002/0039923 | A1 * | 4/2002 | Cannon et al. | 463/42 |
| 2002/0103027 | A1 * | 8/2002 | Rowe et al. | 463/39 |
| 2003/0013513 | A1 * | 1/2003 | Rowe | 463/20 |
| 2003/0064807 | A1 * | 4/2003 | Walker et al. | 463/42 |
| 2003/0092484 | A1 * | 5/2003 | Schneider et al. | 463/25 |
| 2003/0100360 | A1 * | 5/2003 | Manfredi et al. | 463/25 |
| 2003/0119585 | A1 * | 6/2003 | Walker et al. | 463/25 |
| 2004/0002388 | A1 * | 1/2004 | Larsen et al. | 463/43 |
| 2004/0152508 | A1 * | 8/2004 | Lind et al. | 463/19 |
| 2004/0192431 | A1 * | 9/2004 | Singer et al. | 463/20 |
| 2004/0219969 | A1 * | 11/2004 | Casey et al. | 463/20 |
| 2004/0229683 | A1 * | 11/2004 | Mothwurf et al. | 463/26 |

(Continued)

*Primary Examiner* — Steven J Hylinski

(74) *Attorney, Agent, or Firm* — Brooke Quist; Marvin Hein

(57) ABSTRACT

A gaming system including one or more gaming machines, wherein the gaming system monitors the coin out of the gaming machines and triggers a system game award to one or more gaming machines based upon a predetermined criteria that includes the coin out value.

17 Claims, 3 Drawing Sheets

(56) References Cited

U.S. PATENT DOCUMENTS

2004/0248639 A1* 12/2004 Slomiany ........................ 463/16
2005/0054439 A1* 3/2005 Rowe et al. ..................... 463/29
2005/0059482 A1* 3/2005 Hedrick et al. ................. 463/29
2005/0090307 A1* 4/2005 Walker et al. ................... 463/20
2005/0101374 A1* 5/2005 Acres .............................. 463/25
2005/0101376 A1* 5/2005 Walker et al. ................... 463/25
2005/0143168 A1* 6/2005 Torango .......................... 463/25
2005/0209004 A1* 9/2005 Torango .......................... 463/42
2006/0035705 A1* 2/2006 Jordan et al. .................... 463/25
2006/0111178 A1* 5/2006 Gallaway et al. ............... 463/25
2006/0116201 A1* 6/2006 Gauselmann ................... 463/26
2006/0121972 A1* 6/2006 Walker et al. ................... 463/16
2006/0211474 A1* 9/2006 Walker et al. ................... 463/16
2006/0258424 A1* 11/2006 Green ............................. 463/16
2007/0015585 A1* 1/2007 Sartini et al. .................... 463/42
2007/0054722 A1* 3/2007 De Bruin et al. ............... 463/16
2007/0117608 A1* 5/2007 Roper et al. .................... 463/16
2007/0173322 A1* 7/2007 Swamy et al. .................. 463/42
2007/0281775 A1* 12/2007 Kashima ......................... 463/20
2008/0039194 A1* 2/2008 Walther et al. .................. 463/25
2008/0113771 A1* 5/2008 Baerlocher et al. ............. 463/25
2008/0153564 A1* 6/2008 Baerlocher et al. ............. 463/16

* cited by examiner

COIN-OUT GAMING REWARD SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

In the past, various types of gaming machines and associated games have been developed to increase and/or to maintain player participation and patronage. One particular gaming machine that has been developed is a wide area progressive (WAP) system. The WAP system includes a plurality of gaming machines linked to a single progressive jackpot that may be won if a particular game outcome is achieved. In this regard, the WAP system is based upon monitoring the "coin in" of the games. That is, the gaming machines are monitored to determine the amount that is wagered on the gaming machines. In some embodiments of the WAP, the progressive jackpot is awarded when a predetermined "coin in" amount is reached by the gaming machines.

While WAP games have been successful, these games do not provide sufficient flexibility in determining a winning bonus outcome. Casinos are limited in their ability to alter the criteria by which a bonus award in a WAP system is won, since a progressive jackpot is typically awarded when a predetermined symbol combination on the reels of a slot machine is achieved. Furthermore, because WAP systems are based upon the "coin in" to determine a winner, the rules and regulations governing the game are subject to both taxation and gaming regulation. Additionally, WAP systems can be costly due to the monthly fees for administration, the continuous contribution to the progressive jackpot, and the costs of the game machine itself. Accordingly, these fees and costs affect the profitability of a WAP gaming system.

Thus, there is a continuing need for a WAP gaming system that provides casinos with administrative flexibility and increased profitability. Further, there is a continuing need for a gaming system or methodology that provides increased player excitement.

SUMMARY

Briefly, and in general terms, various embodiments relate to a system and method for a wide area gaming system that utilizes "coin out" (or a derivative of coin out) as at least one factor in triggering a system award. Preferably, the system award is not reliant upon a winning outcome on a gaming machine. Rather, the system award is awarded to one or more players based upon the "coin-out" value, and thus is not directly related to whether the players win or lose.

In one embodiment, the gaming system includes a plurality of gaming machines wherein the cumulative, combined gaming machine payout values are defined as "coin out." In this embodiment, the gaming machines are in communication with a monitoring means and a wide area gaming system. In this embodiment, the wide area gaming system monitors the coin out of the gaming machines and triggers an award to one or more gaming machines in response to a particular coin out amount being reached or a particular coin out amount being reached in combination with one or more other triggering events.

In another embodiment, the gaming system includes a plurality of gaming machines associated with a player tracking system and a wide area gaming system that is communication with the gaming machines. In this embodiment, the wide area gaming system controls a gaming system award that is based upon at least the coin out (or a derivative of coin out) of the gaming machines.

In yet another embodiment, stand alone gaming machines provide one or more awards based upon the coin out value in addition to the normal payouts for winning combinations. Optionally, the stand alone gaming machines are associated with a player tracking system.

In another aspect, a method for administering a wide area gaming system is disclosed herein. The method includes at least the following steps: providing a plurality of gaming machines networked with a wide area gaming system; tracking one or more players playing the gaming machines in the wide area gaming system; monitoring the coin out of the gaming machines in the wide area gaming system; and triggering a system award to one or more gaming machines in response to a coin out amount being reached or a combination of coin out amount being reached and other triggering events.

Other features and advantages of the embodiments disclosed herein will become apparent from the following detailed description when taken in conjunction with the accompanying drawings, which illustrate by way of example, the features of the embodiments.

DETAILED DESCRIPTION

Various embodiments disclosed herein are directed to a gaming system that provides casino operators with the ability to reward customers based upon a variety of selectable criteria. Generally, the gaming system is based upon a "coin out" or "player wins" trigger. That is, a "coin out" system monitors and increments a gaming meter based upon the wins on the gaming machines. Once the gaming meter achieves a certain level, the system can determine what types or amount of awards a player may be entitled to receive. Because this system does not rely upon the outcome of a single game to award the player, the casino is able to determine the criteria in which to provide a system award. Additionally, once a system award is triggered, the system award is given to a player whether or not the player wins or loses a particular game. Furthermore, the system is readily adaptable to provide either a progressive or non-progressive award to players. This system may also be utilized at a single property or it can be linked to multiple properties that are either affiliated or unaffiliated. Still further, in one embodiment the coin-out trigger is used on single, stand-alone gaming machines.

Figure 1:
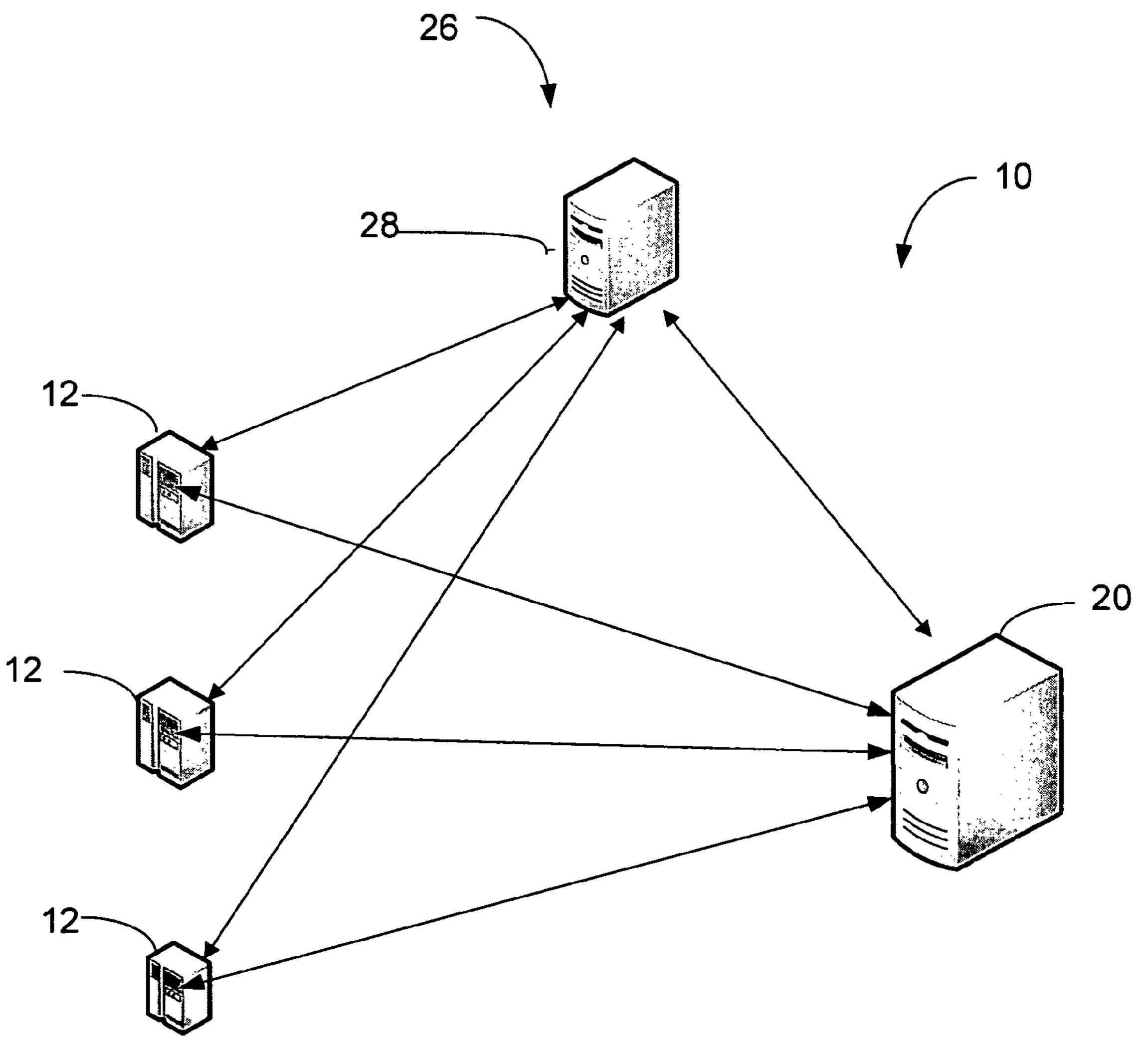
FIG. 1 illustrates one embodiment of a wide area gaming system.
Figure 2:
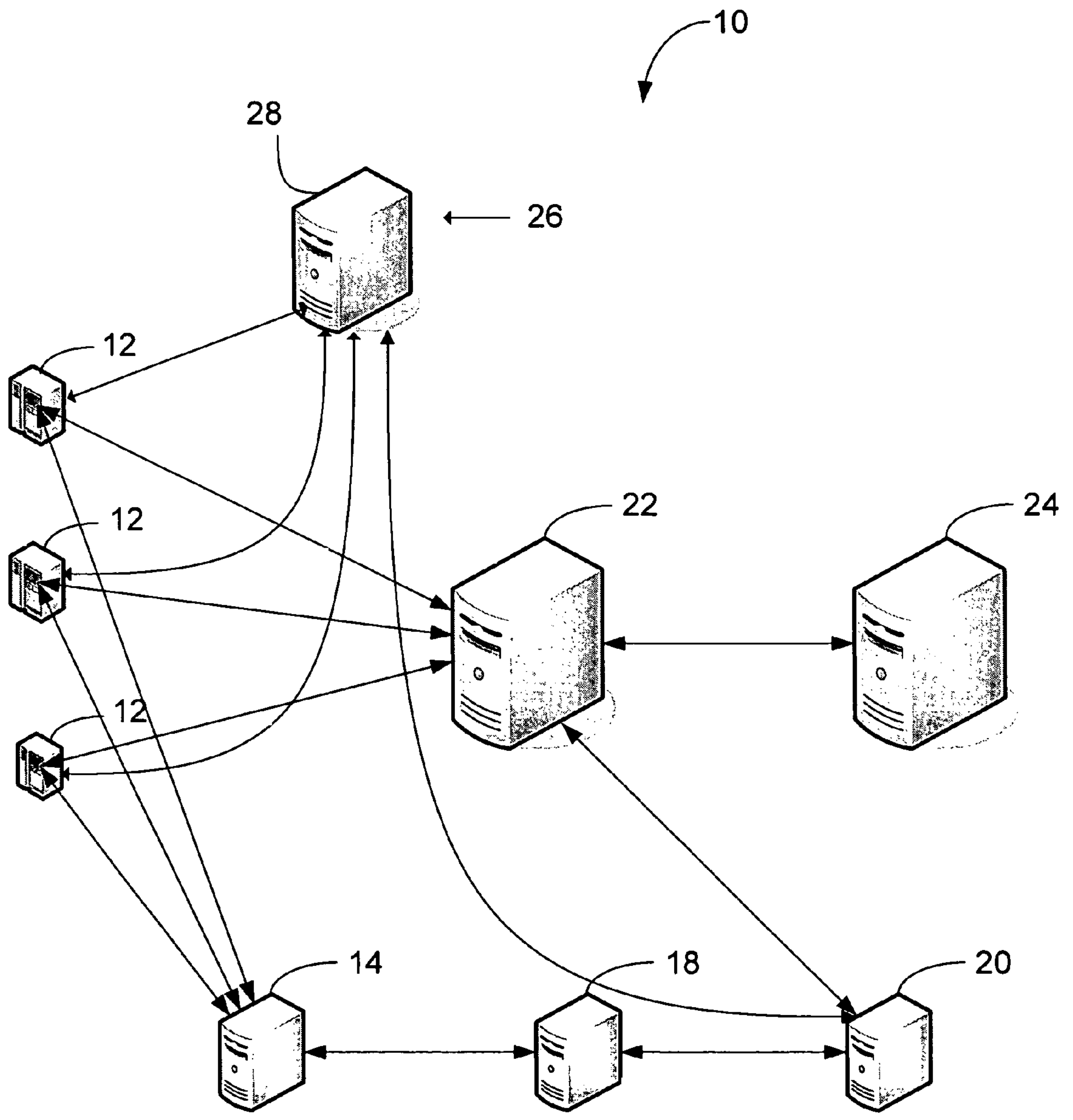
FIG. 2 illustrates the components for another embodiment of a wide area gaming system.

Referring now to the drawings, wherein like reference numerals denote like or corresponding parts throughout the drawings and, more particularly to FIGS. 1-2, there are shown various embodiments of a wide area gaming system 10. Specifically, FIG. 1 illustrates one embodiment of the gaming system 10. The system 10 includes a plurality of gaming machines 12 that are networked with a server 20. The gaming machines 12 are in communication with the server 20 and provide the server with information such as, but not limited to, player tracking information, coin out, the number and type of awards dispensed, and the like.

Generally, the system 10 monitors the "coin out" of the networked gaming machines 12, and any player wins increment a system game meter and one or more reward pools. For instance, in one embodiment, if a player wins 100 credits, the game meter notifies the system 10 of a "coin out" of 100 credits. The system 10 then increments the reward pool by 100 credits. In another embodiment, the system 10 increments the reward pool by a percentage of the coin out. In yet another embodiment, the system 10 increments one or more reward pools by the coin-out amount or by a percentage of the coin out of the gaming machines 12. As those skilled in the art will appreciate, the percentage of the coin out may be determined by the casino operator and can range between approximately 0% to over 100% of the coin out.

In one embodiment, the server 20 monitors the coin out of the gaming machines 12. In another embodiment, the server 20 monitors the coin out of the networked gaming machines 12 via a polled environment protocol. Using this protocol, one or more events selected from a predetermined list of events including, but not limited to, inserting or removing a player tracking card from a gaming machine 12, will cause the server 20 to request a gaming machine 12 for its meters. Those meters include coin in, coin out, and/or other meters typically tracked by a casino.

The server 20 also includes a random number generation system that randomly generates the coin out value at which a system-based award for an award pool is triggered. In these embodiments, the random number generation system may be a random number generator, a pseudo-random number generator, or any other algorithmic-type generator to determine the value of the coin out and other criteria that results in a system-based reward. The server 20 also is capable of broadcasting information to one or more gaming machines 12. In one embodiment, the server 20 broadcasts promotional information to the gaming machines 12 about a bonus game, promotional game, or the like. In another embodiment, the server 20 broadcasts progressive information to the gaming machines 12. As such, the server 20 can push, pull, or otherwise query information to or from the gaming machines 12.

In one embodiment, the system 10 sends a signal to one or more gaming machines 12 to notify one or more players that they have won a system award at the conclusion of a primary game, a promotional game, or a bonus game. In one embodiment, the triggering event is defined as a particular coin out value that is selected by the casino operator, corporation, or other entity. As those skilled in the art will appreciate, the range of coin out may be approximately $0 to approximately $1 billion for a progressive-type jackpot. In one embodiment, the system 10 randomly selects a particular coin value, and the winner is based on the addition of the coin out that triggers the win. That is, the player whose win increments the gaming meter to or past the predetermined coin out value is given the system award. Alternatively, once the coin out value is satisfied, the system award may be distributed to any patron (or divided among all patrons) playing on a networked gaming machine 12 that is part of the system 10.

In another embodiment, the triggering event includes a combination of a particular coin out value and a random selection of date and time range. That is, once a predetermined coin out level has been achieved, the system 10 randomly selects a particular time and one of the players playing at that designated time wins a system award. In another embodiment, the system 10 randomly selects a winner from any active player on the system. Regardless of the triggering event, one or more system awards may be given to one or more players once the triggering event has been satisfied. That is, a patron playing a gaming machine 12 on the system 10 could win a system award whether or not the patron had an actual winning event on the gaming machine. As those skilled in the art will appreciate, a casino operator, corporation, or gaming machine manufacturer may set triggering events for awarding a player a system award.

The system award may include, but is not limited to, cash, merchandise, services, or any combination thereof. In one embodiment, the cash award is a progressive jackpot. In another embodiment, the cash award is randomly granted amount of cash. For instance, the cash award may be $100 that is given away during a randomly selected or predetermined period of time. In yet another embodiment, the system award is merchandise such as, but not limited to, a house, car, motorcycle, jewelry, or the like. In another embodiment, the system award may be services such as, but not limited to, vacations, spa packages, free hotel rooms, free meals, and/or free drinks.

In some embodiments, since the coin out value is the determining factor in distributing a system award, there are various possible regulatory and tax benefits. For example, the value of the system award may be tax deductible in one embodiment since the system award is tied to the initial wager. In contrast, player club points or other awards are typically not tax deductible in various jurisdictions because these points or awards are not tied to a wager. Accordingly, the coin out gaming system provides a system 10 with the potential for increased profitability by reducing tax liability.

In addition to the above-mentioned triggering events, the system 10 may include additional criteria for distributing a system award. In one embodiment, only "qualified" players are eligible for any awards from the wide area gaming system 10. In one embodiment, a qualified player is defined as any player having a player card. In another embodiment, a qualified player is defined as a player having a player tracking card and playing a gaming machine 12 for a specified period of time based upon coin out. In yet another embodiment, a qualified player is defined as a player at a particular club level including, but not limited to, a Gold Club or Platinum Club member. For instance, in order to qualify for these club levels, a Gold Club member would have losses of $500/month and a Platinum Club member would have losses of $1000/month. As those skilled in the art will appreciate, the casino operator will typically determine the criteria for a Gold or Platinum Club member. Furthermore, the casino operator or corporate entity will typically determine the number of club levels.

In another embodiment of a player club, club levels are defined by play levels. For instance, players are categorized into different club levels based upon the average wager and the rate of play (i.e., the number of games played for a predetermined period of time). In yet another embodiment, club levels may be based upon a combination of time of play and average wager per game.

In various embodiments, the club level is based upon the gambling habits of the player. When a player gambles sufficiently to be promoted from a lower club level to a higher club level, the player may be automatically advanced and eligible for the system award from the higher club level, in addition to the system award from the player's previous club level. In another embodiment, the player is advanced to the next club level only after the casino has reviewed the player's playing levels. For instance, a casino may review player gaming levels on a monthly basis (or other predetermined time interval) and determine which players should be promoted to a higher club level or demoted to a lower club level. Alternatively, the casino may override the selection criteria for various club levels and promote, maintain, or demote players.

In those system embodiments having multiple player club levels, each club level may have different prizes. For instance, the Platinum club member may be entitled to larger progressive jackpots, a more expensive car, or other more valuable items as compared to a Gold Club member. Furthermore, in one embodiment, the Platinum club member may be entitled to choose between prizes in different club levels. Alternatively, club members that win a system award may choose a prize from their level or a lower level.

In one embodiment, when the system 10 determines that a winner selection criteria or a predetermined coin out meter has been met, a signal is immediately transmitted to the gaming machine 12, notifying the player(s) of a system award. In another embodiment, the player is notified that they have won a system award when the player removes his player tracking card from the gaming machine 12. Optionally, the gaming machine 12 may have lights, sounds or other means of notifying a player that they have won a system award. In another embodiment, the gaming machine 12 has a graphical display that notifies a player that they have won a system award. In still another embodiment, a casino representative goes to the winning machine and personally notifies the player that they have won an award. As those skilled in the art will appreciate, one or more of the above-mentioned embodiments may be combined together to notify a player that they have won a system award.

In one embodiment, once a player has won a system award, the award is downloaded to the player's account for redemption. The player can then redeem the cash prize on the gaming machine 12 by taking a positive action such as, but not limited to, depressing a button or requesting that the award be downloaded to the gaming machine. In another embodiment, the gaming machine 12 prints out a voucher that is redeemable for the award. In yet another embodiment, a player supplies biometric data such as, but not limited to, a fingerprint or signature to redeem the prize at the gaming machine 12. In another embodiment, the player inputs a PIN number in order to redeem the prize. As those skilled in the art will appreciate, it is contemplated that the gaming machine 12 may have any means for verifying the identity of a player that is known or developed in the art.

In one embodiment, if a system award is not won during the promotion or during a particular period of time, the system 10 can reassign the system award. In one such embodiment, the expired credit for an unclaimed system award may be reassigned and used to fund one or more award pools for future promotions. In another embodiment, the expired credit is reassigned and used to fund a future progressive jackpot. As those skilled in the art will appreciate, the progressive jackpot may be wide area progressive jackpot or a progressive jackpot for a stand-alone gaming machine.

Another embodiment of the gaming system 10 is illustrated in FIG. 2. This embodiment of the gaming system 10 includes a plurality of gaming machines 12, a game management unit 14, a slot management system 18, a server 20, a wide area gaming server 22, and, optionally, a central server 24. As shown in FIG. 2, the gaming machines 12 are in communication with the game management unit 14 and the wide area gaming server 22. The game management unit 14 is also in communication with slot management system 18. Additionally, the slot management system 18 is in communication with the server 20 as is the wide area gaming server 22.

In one embodiment of the system 10, the game monitoring unit (GMU) 14 is a device that is connected to the circuitry of the gaming machine 12. The GMU 14 monitors the game, coin status, player winnings, and the gaming machine itself. Preferably, the GMU 14 obtains gaming meter data from the gaming machines 12, after which the meter for the GMU is incremented based upon the meter data received from the gaming machines. In one embodiment, the GMU 14 sends the monitored information to the server 20 for processing. In other embodiments, the monitored information also is sent to the central server 24. In still another embodiment, the gaming meter data is be dually exported to the wide area gaming server 22 and to one or more other locations including, but not limited to, the slot management system 18, server 20, or central server 24. In another embodiment, the gaming meter data is sent to the wide area gaming server 22, which, in turn, sends the gaming meter data onto one or more other locations including, but not limited to, the slot management system 18, server 20, or central server 24.

In another embodiment, the system 10 includes a slot management system (SMS) 18, which is a fully integrated accounting database. The SMS 18 manages the networked gaming machines 12 and obtains gaming information, player tracking activity, and employee service activity. For instance, the SMS 18 accounts for and checks bill changer meter integrity, obtains coin out data, and calculates a theoretical percentage for player rating in addition to other analytical and operations functions. In one embodiment, the SMS 18 captures the data rate from all denominations and from all manufacturers of slot machines and updates all changes in data content on a real-time basis. A real-time basis being defined as transmission of data from the slot machine to the SMS after each event (e.g., handle pull) on the slot machine. Alternatively, the SMS 18 updates data content, such as player account information, at the end of an entire play session, rather than after each game or on a real-time basis.

As shown in FIG. 2, the system 10 includes a wide area gaming server 22. In one embodiment, the wide area gaming server 22 is a back end server with respect to the server 20. In another embodiment, the wide area gaming server 22 is integral with the server 20. Generally, the wide area gaming server 22 is an independent system that determines the amount of a system award and the triggering event for the system award. Optionally, the wide area gaming server 22 also determines all the qualifying patrons that are playing gaming machines 12 on the system 10. Accordingly, the casino operator can set the triggering events for awarding a system award to one or more of the qualifying patrons.

In one embodiment, the wide area gaming server 22 randomly selects the triggering events for one or more system awards with a random number generator system. In another embodiment, the wide area gaming server 22 includes a user interface that allows a casino operator to select the triggering events for a system award. Permitting a casino operator to select the triggering events provides the casino operator with the opportunity to generate more gaming interest during slow time periods. In this embodiment, the wide area gaming server 22 may include a user interface (not shown) to allow the casino operator to select or to determine the criteria for a system award including, but not limited to, a specific date, date range, time, or time range. In various embodiments, the user interface (not shown) of the wide area gaming server 22 may be a touch screen, a computer terminal, or a combination of a display device an input device (e.g., a keyboard and mouse).

In the embodiment shown in FIG. 2, the wide area gaming server 22 is in communication with a central server 24. In another embodiment, the central server 24 is located at the same site (i.e., physical location) as the server 20 and the wide area bonus server 22. In still another embodiment, the central server 24 is located at a location separate and apart from the other components in the system 10. As those skilled in the art will appreciate, in some embodiments, the central server 24 is located in another state or country from the gaming machines 12 or the servers 20, 22.

In one embodiment, the central server 24 includes a casino management system. The casino management server has information on qualifying customers and their applicable gaming activity including, but not limited to, property identification, patron name, player card number, coin out, time of player rating, and relays a card out message to the system. Alternatively, this information is storable in the system's database and retained for selected promotional periods. For instance, the database of qualified players may be located within the server 20 or the wide area gaming server 22.

One of ordinary skill in the art will appreciate that not all gaming systems 10 will have all these components and may have other components in addition to, or in lieu of, those components mentioned here. Furthermore, while these components are viewed and described separately, various components may be integrated into a single unit in some embodiments. For instance, the server 20 may include the slot management system 18 and the wide area gaming server 22.

Figure 3:
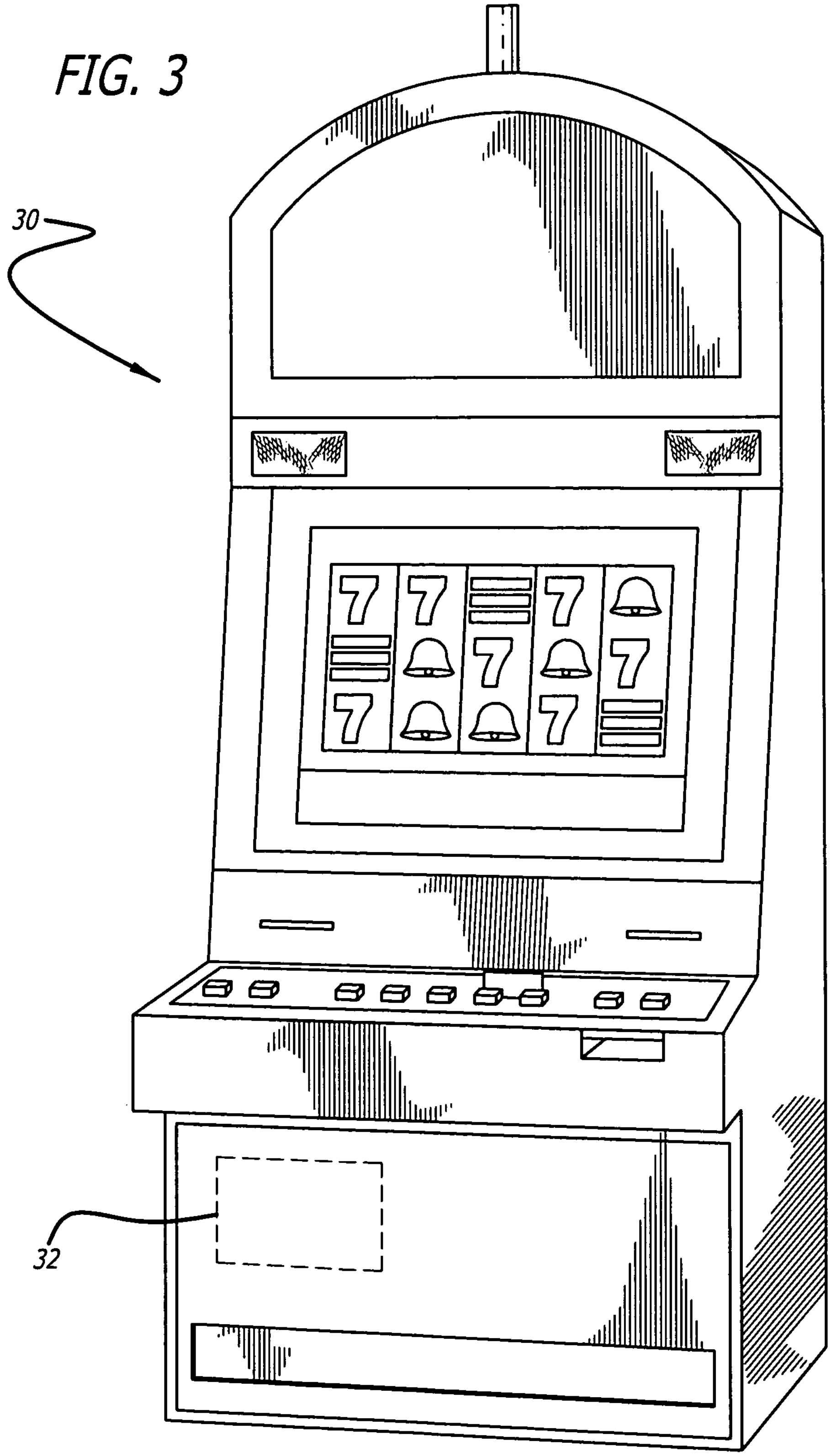
FIG. 3 illustrates one embodiment of a stand-alone gaming machine capable of distributing one or more system awards based upon a coin out value.

While the previous embodiments relate to a gaming system, in another aspect, a stand-alone gaming machine 30 may distribute one or more system awards based upon coin out. As shown in FIG. 3, in one embodiment, the gaming machine 30 includes an internal coin out system 32 that randomly selects a coin out value that triggers the system award, monitors the coin out meter, funds one or more award pools, and distributes one or more "coin out" awards. In another embodiment, the coin out system 32 may be external from the gaming machine 30. Like the coin out system 10, the "coin out" award for the stand-alone gaming machine 30 is not based directly upon a particular winning outcome on the gaming machine. In one embodiment, if the "coin out" award is not distributed after a predetermined period of time, the unclaimed funds from the "coin out" award may be used to fund one or more "coin out" awards.

In yet another embodiment, the stand-alone gaming machine 30 is a stand-alone progressive game. Alternatively, the stand-alone progressive gaming machine 30 is part of a wide area progressive network. In this embodiment, the gaming machine 30 has its own progressive jackpot in addition to being a part of a wide area progressive jackpot. In either of these embodiments, the progressive jackpots may be incremented by the coin out value or a percentage of the coin out value. Once the predetermined coin out value has been satisfied, the gaming machine will distribute a "coin out" award, which may be the stand-alone game's progressive jackpot, the wide area progressive jackpot, or a combination thereof. In these embodiments, if the "coin out" award is not distributed after a predetermined period of time, the unclaimed funds from the "coin out" award may be used to fund one or more progressive games.

In various embodiments of the coin out gaming machines and coin out gaming system 10, the gaming machines 12 include, but are not limited to, mechanical slot machines, video slot machines, video poker machines, keno machines, video blackjack machines, bingo machines, or gaming machines offering one or more of the above described games. In various embodiments, the gaming machines 12 may be either single payline games or multi-payline games. With respect to the coin out systems 10, in one embodiment, the server 20 is networked with gaming machines 12 offering the same type of game (e.g., video poker, blackjack, or keno). Alternatively, in another embodiment, the server 20 is networked with different types of gaming machines 12 (i.e., the networked gaming machines offer different types of games). For instance, a mechanical slot machine, a video poker machine and video blackjack machines all may be networked together in one system 10.

Additionally, in one embodiment, the gaming machines 12 are located in one casino. In another embodiment, the gaming machines 12 are located in multiple sites. These multiple sites may be one or more casinos or any other locations where gaming is permitted. In other embodiments, the multiple sites are in the same state or in different states. In yet another embodiment, the multiple sites are affiliated (i.e., owned or controlled by a single corporate entity). In another embodiment, the multiple sites are unaffiliated. For instance, the system 10 may be used for gaming machines 12 located at unaffiliated Indian gaming casinos. Because the gaming machines 12 are networked with the system 10, the gaming machines can be placed in a plurality of locations.

In one embodiment, the gaming machines 12 either include or are associated with a player tracking system 26. In one embodiment, the player tracking system 26 is a player card reader and an associated central system 28. In another embodiment, the reader is capable of reading information contained on a player card and transmitting this information to the tracking central system 28, which in turn transmits the data to the server 20, or directly transmit this information to the server. In another embodiment, the player tracking system 26 is a player card reader/writer that can read and write information to a player card. Information that may be read from the card includes, but is not limited to, the player's name, rating, and/or accrued points. In another embodiment, the player tracking system 26 includes biometric information including, but not limited to, fingerprints or electronic signatures to verify the identity of the cardholder.

In another embodiment, the system 10 may not include a player tracking system. According to other embodiments, particular gaming machines 12 may be dedicated to the system 10 or only linked with the system. In yet another embodiment, a casino operator may select the gaming machines 12 to incorporate into the wide area gaming system 10. Thus, the scope of the system 10 is scalable based upon the casino operator's criteria.

In another embodiment, the gaming machine 12 includes a display. In one embodiment, the display is a two-line digital display (e.g., LED, LCD, VD, or the like). As those skilled in the art will appreciate, other gaming machine embodiments may include displays having one or more lines.

In another embodiment, the display is a graphical interface, which is the subject of U.S. patent application Ser. No. 10/943,771, filed Sep. 16, 2004, which is hereby incorporated by reference and made a part hereof. In this embodiment, the graphical interface includes a web content capable display screen and an embedded processor. Preferably, the web content capable display screen presents web information to a user via the display screen. The embedded processor preferably utilizes an internal operating system and communicates with the gaming processor. Preferably, the embedded processor reads incoming data, translates the data into a web protocol (web authoring language), if necessary, and maps the data to the web content capable display screen. In this manner, the web content capable display screen increases user excitement by providing a richer gaming experience. Furthermore, the display allows the player to input information, make selections, receive promotional information or other types of information including, but not limited to, notification that the player has won a system award.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A gaming system, comprising:

a plurality of gaming machines, wherein a coin out value is defined as a cumulative, combined payout value from a gaming machine and coin in value is defined as the amount wagered at a gaming machine;

a player tracking system, wherein the gaming machines communicate with the player tracking system;

a wide area gaming system in communication with the gaming machines, wherein the wide area gaming system controls a gaming system award that is issued to a player identified via the player tracking system upon fulfillment of one or more predetermined criteria disregarding coin in value and related to cumulative coin out value wherein at least the predetermined coin out value is selected by the wide area gaming system; and at least one gaming machine is configured to have a dedicated gaming machine award issued to a player based upon fulfillment of criteria related to play of said at least one gaming machine including cumulative coin out for said at least one gaming machine, and wherein the gaming system and gaming machine awards are issued independently of a game result on the first gaming machine.

2. The gaming system of claim 1 further comprising a centralized server system configured for selection of at least said gaming system award criteria and in communication with the wide area gaming system.

3. The gaming system of claim 1, wherein the wide area gaming system includes a random number generator to select said gaming system award coin out value.

4. The gaming system of claim 1, wherein the gaming system award is credited to a winning player's account.

5. The gaming system of claim 1, wherein the gaming machines are located in multiple properties.

6. The gaming system of claim 1, wherein the player tracking system includes one or more player levels, wherein the player levels are based upon a player's wagering history.

7. The gaming system of claim 1, wherein the gaming system award is a progressive award.

8. The gaming system of claim 1 comprising a random number generator to randomly select for said criteria said coin out value.

9. The gaming system of claim 1 comprising at least one is said awards is a progressive prize.

10. A gaming system, comprising:

a plurality of gaming machines, wherein a coin out value is defined as a cumulative, combined payout value from a gaming machine;

apparatus to monitor the gaming machines in the gaming system; and a wide area gaming system, wherein the wide area gaming system is linked with the gaming machines and in communication with the monitoring apparatus, wherein the wide area gaming system monitors the coin out of the gaming machines and presents a system award to one or more gaming machines in response to a cumulative coin out amount of said linked gaming machines being reached or a combination of said cumulative coin out amount being reached and one or more other triggering events, and wherein the predetermined coin out value is selected by the wide area gaming system and the predetermined coin out value is not known or presented to the player;

at least one gaming machine is configured to have a dedicated gaming machine award issued to a player upon fulfillment of criteria related to cumulative coin out value at said at least one gaming machine, said gaming machine award separate from said system award, and the system award is payable to a first gaming machine of the plurality of gaming machines even though the first gaming machine presents a non-winning game result.

11. The gaming system of claim 10, wherein the system award is credited to a winning player's account.

12. The gaming system of claim 10, wherein the gaming machines are located in multiple properties.

13. A system including a plurality of gaming machines for providing a system and a gaming machine award, each gaming machine generating coin out data for wins paid during play, said system comprising:

a communication link between a server and each of said gaming machines;

said server configured to store award triggering criteria including a cumulative coin out value and monitor said coin out data of said gaming machines;

at least one of said gaming machines configured to have a dedicated gaming machine award issued to the player thereof upon matching award criteria including a cumulative coin out value of said at least one gaming machine;

said server configured to issue said system award to at least one gaming machine responsive to the triggering criteria has been satisfied.

14. The gaming machine of claim 13 comprising a random number generator associated with said server to randomly select for said criteria said coin out value.

15. A method for providing a system award and a gaming machine award in a system including a plurality of gaming machines, each gaming machine generating coin out data for wins paid during play, said method comprising:

providing for communication between a server and each of said gaming machines;

storing award triggering criteria including a cumulative coin out value and monitoring said coin out data of said gaming machines;

configuring at least one gaming machine to have a dedicated gaming machine award issued to the player thereof upon matching award criteria including a cumulative coin out value of said at least one gaming machine;

providing for issuing said system award to at least one gaming machine responsive to satisfaction of said triggering criteria.

16. The method of claim 15 comprising randomly selecting at least one of said coin out values.

17. The method of claim 15 comprising accumulating for at least one of said awards, a progressive prize.

* * * * *